United States Patent [19]
Hill et al.

[11] Patent Number: 4,947,070
[45] Date of Patent: Aug. 7, 1990

[54] CONTROL APPARATUS

[75] Inventors: Grayham Hill; Philip Tittler, both of Preston, England

[73] Assignee: British Aerospace Public Limited Company, London, England

[21] Appl. No.: 212,082

[22] Filed: Jun. 24, 1988

Related U.S. Application Data

[63] Continuation of Ser. No. 53,546, May 26, 1987, abandoned, and Ser. No. 850,433, Apr. 8, 1986, abandoned, and Ser. No. 638,774, Aug. 8, 1984, abandoned.

[30] Foreign Application Priority Data

Aug. 9, 1983 [GB] United Kingdom ............... 8321376

[51] Int. Cl.$^5$ .......................... H02K 7/06; G05G 1/00
[52] U.S. Cl. .......................................... 310/80; 310/12; 244/223; 74/424.8 R
[58] Field of Search ........................ 310/80, 81, 82, 83, 310/12; 244/223; 74/424.8 VZ, 424.8 R; 318/685, 628

[56] References Cited

U.S. PATENT DOCUMENTS

| | | | |
|---|---|---|---|
| 2,446,393 | 8/1948 | Russell | 192/2 |
| 2,772,841 | 12/1956 | Bonsteel | 244/83 |
| 3,156,132 | 11/1964 | Borie, Jr. | 74/424.8 |
| 3,161,074 | 12/1964 | Korthaus et al. | 74/424.8 |
| 3,315,106 | 4/1967 | Reynst | 310/191 X |
| 3,331,971 | 7/1967 | Möller | 310/364 |
| 3,331,972 | 7/1967 | Möller | 310/36 X |
| 3,660,704 | 5/1972 | Paine | 310/80 |
| 3,824,420 | 7/1974 | Stegeman et al. | 310/80 |
| 4,110,649 | 8/1970 | Mas | 310/209 X |
| 4,438,662 | 3/1984 | Walton et al. | 310/80 X |

FOREIGN PATENT DOCUMENTS 2073887 4/1984 United Kingdom.
2114717 3/1986 United Kingdom.

*Primary Examiner*—Patrick R. Salce
*Assistant Examiner*—Judson H. Jones
*Attorney, Agent, or Firm*—Cushman, Darby & Cushman

[57] ABSTRACT

Control apparatus of the kind disclosed in UK patent specification Nos. 2,073,887 and 2,114,717, i.e. in which a movable operating member, arranged to control associated apparatus such as an aircraft engine, is coupled to an electric stepper motor, the motor being energizable to move the operating member and/or to generate a 'feel' resistance to, or detents in, the manual movement of the operating member, the apparatus including a ball-screw assembly comprising a lead-screw and ball-nut, one of which is connected to the operating member and, with the operating member, is linearly movable with respect to the other, the stepper motor being coupled to the ball-screw assembly so that rotation of the motor rotor produces, or is produced by, relative rotation of the lead-screw and ball-nut. The apparatus can be constrcted as a retrofit unit for being installed in an existing control system including a manual lever or the like coupled to say an aircraft engine so as to provide an automatic operating mode and/or feel force generation for the existing system.

5 Claims, 3 Drawing Sheets

CONTROL APPARATUS

This is a continuation of application Ser. No. 07/053,546, filed May 26, 1987, and application Ser. No. 06/850,433, filed Apr. 8, 1986 and application Ser. No. 06/638,774, filed Aug. 8, 1984, which were abandoned.

Our UK Patents Nos. 2,073,887B and 2,114,717A, disclose control apparatus, for example an aircraft thrust demand unit or 'throttle-box', wherein a manually movable operating member or lever is operable to be moved to effect a control action, for example via a position encoder and suitable control signal link, or via a mechanical coupling, and wherein the operating member is associated with an electric motor of which the member may form a part and which is preferably a rotary or linear stepper motor, the arrangement being such that, while the motor may be energised to move the operating member and hence provide an automatic control mode of the apparatus, the motor is nevertheless overridable manually without disengaging or declutching the motor. Instead of or in addition to being able to move the operating member or lever, the motor may be operable to provide a measure of resistance or 'feel' to manual movement of the member and/or to introduce a more marked resistance to such movement through certain detent positions within the overall range of movement.

According to one aspect of the present invention, there is provided control apparatus for enabling an operator to control associated apparatus to which, in use, the control apparatus is connected, for example a thrust demand unit for enabling a pilot to control the engine of an aircraft, the apparatus comprising a fixed support member, a movable control member supported by the support member, output means coupled to the control member and operable for transmitting to said associated apparatus control signals indicative of the position of the control member relative to the support member, an electrical stepper motor coupled to the control member, and motor energisation means connected to said motor and operable for driving said motor to produce movement of the control member and/or for energising said motor to produce a resistance against manual movement of the control member, characterised in that the apparatus comprises a recirculating ball-screw assembly including a lead-screw (3,22,31,43) and a ball-nut (4,23,33,42,) engaged upon the lead-screw, one of the said lead-screw and ball-nut being coupled to said control member (2,24,34,44,) and being, with the control member, linearly movable with respect to the other of said lead-screw and ball-nut, said stepper motor (10,20,30,40) being a rotary stepper motor and being coupled to said ball-screw assembly for relative rotation of the rotor (5) and stator (6) of the motor to be accompanied by relative rotation of the ball-nut and lead-screw.

According to another aspect of the invention, there is provided control apparatus for enabling an operator to control associated apparatus to which, in use, the control apparatus is connected, for example a thrust demand unit for enabling a pilot to control the engine of an aircraft, the apparatus comprising a fixed support member, a movable control member supported by the support member, output means coupled to the control member and operable for transmitting to said associated apparatus control signals indicative of the position of the control member relative to the support member, an electrical stepper motor coupled to the control member, and motor energisation means connected to said motor and operable for driving said motor to produce movement of the control member and/or for energising said motor to produce a resistance against manual movement of the control member, characterised in that the control apparatus is constructed as a retrofit unit for being incorporated into an existing control system which system includes said associated apparatus and a manually movable control device coupled to control the apparatus, the movable control member of the control apparatus comprising connection means (26,36,46,59) for being mechanically coupled to said control device of the existing control system (FIGS. 2 to 5).

In a specific embodiment, the present invention includes a control apparatus for enabling an operator to control another apparatus which is associated with the control apparatus and to which the control apparatus is connected such as, as noted above, a thrust demand unit for enabling a pilot to control the engine of an aircraft. As is well known in this environment, modern day stick controls for a jet pilot are highly responsive to any movement of the control stick due to the face that the presently available control sticks such as those used in jet fighters employ extremely sensitive motion transducers which are electronically connected through suitable computing equipment to the flight control apparatus such as the flaps, ailerons and speed control devices for the engines. To prevent overshooting in maneuvering the aircraft, the present invention artificially introduces a resistance to movement of the control apparatus without unduly sacrificing the refinement in control afforded by the sensitive transducers installed in such apparatus. Specifically, the apparatus of the present invention comprises a fixed support member, a moveable control member supported by the support member, such as a handle that will be grasped by the pilot, output means coupled to the control member and operable for transmitting to the associated apparatus, such as the thrust control for the output of the jet engine or the hydraulic positioning controls for the flaps and ailerons, signals indicative of the position of the control member relative to the support member. Further, the present invention provides an electrical stepper motor coupled to the control member with the motor energization means connected to the stepper motor and operable for driving said motor to produce movement of the control member and for energizing the stepper motor to produce the desired resistance against manual movement of the control member. In a specific embodiment, the apparatus includes a recirculating ball-screw assembly which is of conventional construction such as that illustrated in U.S. Pat. No. 3,660,704, the disclosure of which is hereby incorporated by reference. The ball screw assembly includes a lead-screw and a ball-nut engaged upon the lead screw. One of either the lead-screw or ball-nut is coupled to the control member and being, with the control member, linearly movable with respect to the other of the lead-screw or ball-nut. The stepper motor is preferably a rotary stepper motor and is coupled to the ball-screw assembly for relative rotation of the rotor and stator of the motor to be accompanied by relative rotation of the ball-nut and lead-screw. The lead-screw is fixed with respect to the support member and the rotor of the stepper motor is fixed to the ball-nut. The control member should be fixed to the stator of the motor while the control member and the stator and rotor of the motor are movable linearly with respect to the lead-screw and support member.

For a better understanding of the invention and to show how the same may be carried into effect, reference will be made, by way of example, to the accompanying drawings in which.

Figure 1:
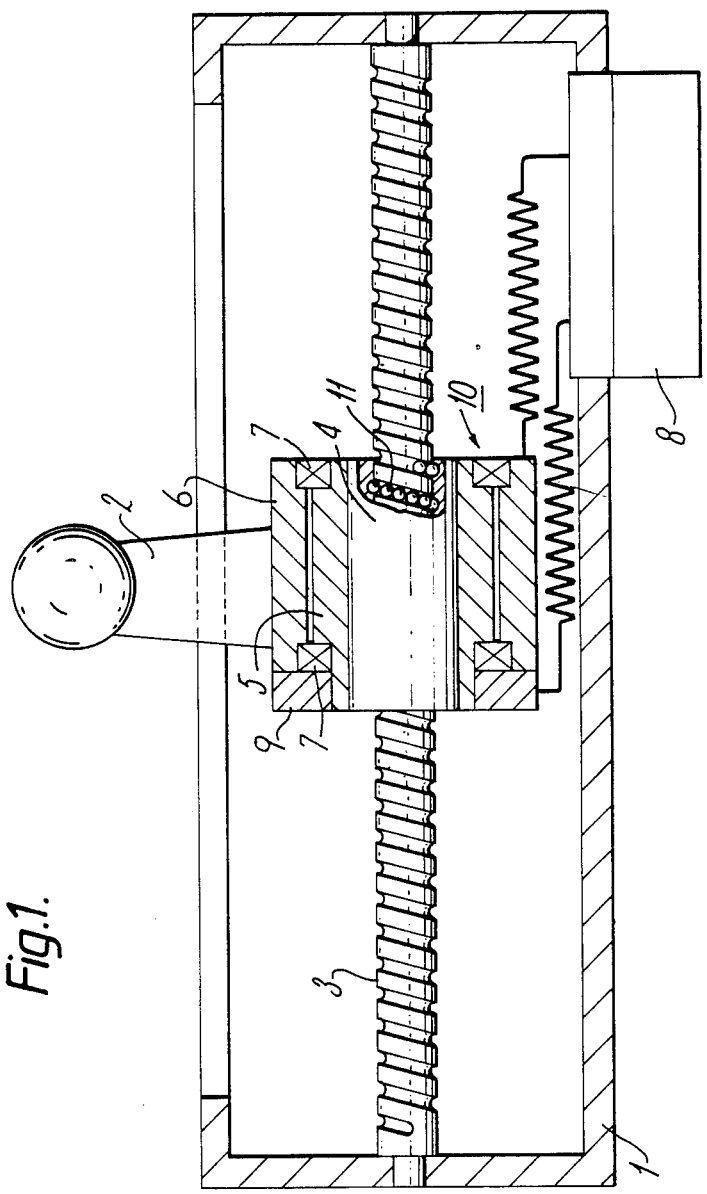
FIG. 1 is a sectional diagrammatic view of an aircraft throttle-box.

FIG. 1 shows an aircraft throttle-box comprising a rectangular enclosure 1 with a slotted top from which protrudes a handle 2. Within the enclosure 1 there is a ball-screw and rotary stepper motor assembly including a fixed helically grooved shaft 3 on which there is mounted a co-acting recirculating ball-nut 4. As is known, the nut of a ball-screw comprises a cage holding a series of balls 11 which are engaged in the groove of the shaft 3 and which are guided by the cage along a continuous or recirculating path. A ball-screw acts in just the same way as an ordinary threaded lead-screw and nut—the balls together act like the thread of the ordinary nut to transmit motion between the nut and the screw-shaft but because the balls are able to roll within the shaft-groove, the ball-screw may have a very low coefficient of friction such that, for a much finer thread pitch than the case with an ordinary lead-screw assembly, the ball screw is reversible in the sense that, if the nut thereof is pushed along the shaft, it will move either by rotating itself around the shaft or by rotating the shaft. In the present case, the ball-nut 4 is fixed within, or is formed as an integral part of, the rotor 5 of an electrical stepper motor 10 which also comprises a stator 6. The stator is supported with respect to the rotor by thrust transmissive bearings 7. The inner end of the handle 2 is fixed to the stator 6. The motor windings are connected to an electronic motor drive and control output unit 8. The throttle-box also includes any suitable means for signalling to unit 8 the position along shaft 3 of the movable part of the ball-screw and motor assembly. This can be by use of any suitable ones of the encoding methods and devices described in our UK patent No. 2,073,887B and UK patent No. 2,114,717A, or by any other suitable device. For example, a rotary or linear position encoder 9 could be provided as part of the ball-nut and motor assembly.

During manual throttle operation of the aircraft, the handle 2 is moved back and forth along the shaft 3 carrying with it the motor and ball-nut, the ball-nut and motor rotor rotating with respect to the motor stator to permit this rotary movement. The movement is translated to a control signal acting on the engine throttle(s) either electrically by way of the position encoder 9 and unit 8, or any suitable kind of mechanical output could be provided, for example a simple Bowden cable arrangement coupled to the motor. The motor can be energised during such manual operation to give a predetermined 'feel' resistance to the movement and/or to generate marked detents at certain positions just as described in the aforementioned patent and patent application. In auto-throttle mode, the motor is powered to a level sufficient to produce rotation of the rotor and ball-nut and hence driven movement of the motor and handle 2 along the shaft 3. At any time during the auto-throttle mode, either when the motor is being electrically moved or when it is being electrically held in a position to which it has been moved, the motor force can be overcome by the pilot if he wishes without having to disconnect or de-clutch the motor.

The handle 2 could be replaced by a lever of which one end protrudes from enclosure 1, the other end is pivotably connected to the enclosure at a point below the shaft 3 and motor, and which is pivotally coupled at an intermediate point to the motor stator. This gives a quadrant movement of the protruding portion of the lever but the operation is otherwise the same as for the illustrated embodiment.

The apparatus shown could be used for other applications, as well as for aircraft throttle control, either on-board an aircraft to control say wing sweep or the like, or elsewhere, for example to control valves, and like equipment in the factory.

Instead of being constructed as a control box with an operator's handle, apparatus according to the invention could be in the form of an actuator unit which can be incorporated in or added to some existing manual control device to give that device a servo or automatic operating capability if it does not already have one or simply so as to provide for electrically generated 'feel' resistance and/or detents to the manual movement. FIGS. 2, 3, 4 and 5 illustrate respective actuator units which could be incorporated into the design of aircraft auto-throttle-boxes or retro-fitted to an existing manual throttle-box.

Figure 2:
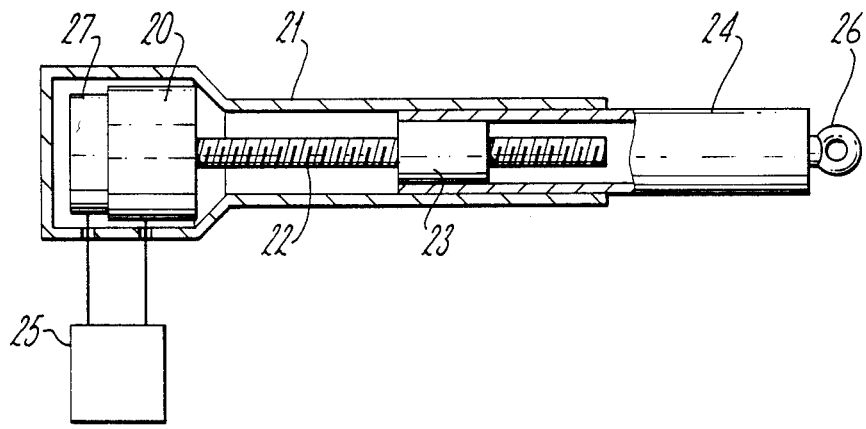
FIGS. 2 to 5 are diagrammatic views of respective actuators for use in or in association with aircraft throttle-boxes.

In FIG. 2, an assembly of a rotary stepper motor 20 and rotary position encoder 27 is fitted in one end of a cylindrical housing 21, the motor shaft 22 being formed as the lead-screw of a recirculating ball-screw which also comprises a ball-nut 23. The nut 23 is fixed to one end of a hollow, elongate actuator output member 24 which is able to slide within, and the other end of which protrudes from, housing 21, this other end being adapted (for example by comprising an eyelet 26 as shown) for coupling to the handle of a throttle-box either locally or elsewhere in the mechanical transmission between the handle and engine throttle. The motor and encoder are coupled to an electronic motor drive and interface unit 25.

Figure 3:
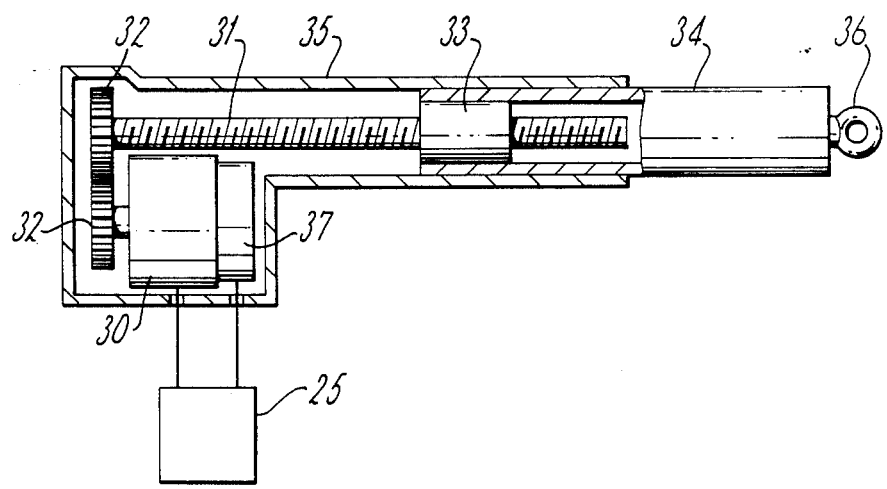

The FIG. 3 actuator comprises an output member 34 with an eyelet 36, a ball-screw shaft 31 and ball-nut 33 arranged in a housing 35 in a manner similar to that shown in FIG. 2 except that, in FIG. 3, the assembly of a motor 30 and encoder 37 is mounted below the ball-screw shaft 31 and is coupled thereto by gears 32.

Figure 4:
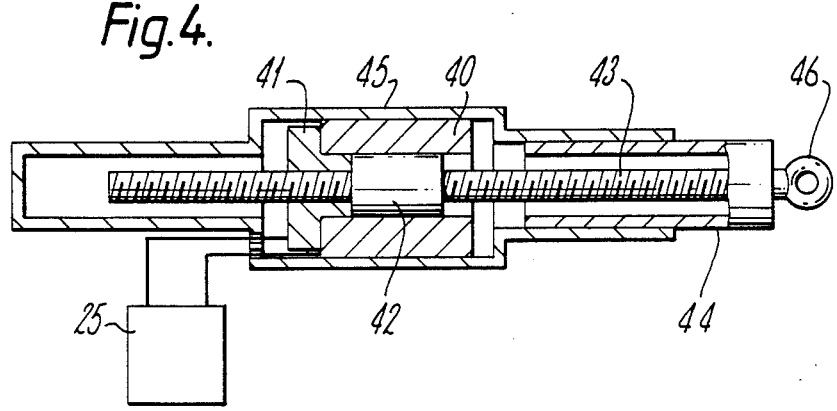

In FIG. 4, the motor 40, position encoder 41 and ball-nut 42 form an integral assembly like that in FIG. 1. Here, however, the ball-screw shaft 43 is able to move linearly with respect to a housing 45, but not rotate, while the motor stator is fixed with respect to the housing 45. Rotation of the motor rotor and ball-nut thus move the shaft 43 and the attached actuator output member 44 with its eyelet 46 linearly.

Figure 5:
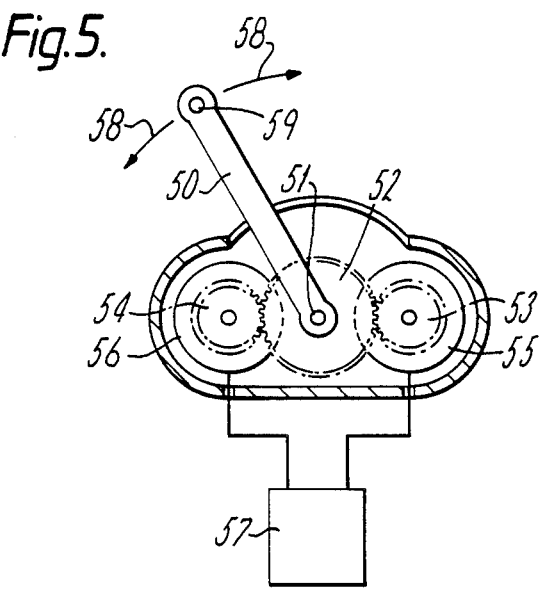

In FIG. 5, the actuator output member 50 has an eyelet 59 at one end and its other end connected to a shaft 51 which also supports a gear wheel 52 in engagement with respective further gear wheels 53 and 54 on the shafts of a rotary stepper motor 55 and a position encoder 56, both of which are connected to an electronics unit 57 as before. In this case, the actuator output member 50 has a quadrant movement as shown by arrows 58.

We claim:

1. Control apparatus for enabling, in a manual control mode, an operator, and in an automatic control mode, an automatic control system, to control associated apparatus to which, in use, the control apparatus is connected, comprising:
- a support member,
- a lead-screw fixedly attached to said support member,
- a drive assembly including a rotary stepper motor having a rotor fixed to a ball-nut engaged upon the lead-screw and forming a recirculating ball-screw assembly therewith and a stator fixed to a hand control member,
- output means coupled to the drive assembly indicative of the position of the drive assembly relative to the lead-screw, and,
- motor energization means connected to said motor for selectively energizing windings thereof, said control apparatus being arranged so that in the manual mode in use the drive assembly is moveable axially with respect to the lead-screw by means of the hand control member resulting in corresponding rotation of the rotor and ball-nut with respect to the stator and lead-screw respectively whereupon the windings of the motor are so energized by the motor energization means that said rotation is selectively opposed to provide the operator with a feeling of resistance to movement of the hand control member, and so that in use in the automobile mode the drive assembly is moveable axially with respect to the lead-screw in response to energization of the windings of the motor by the motor energization means with corresponding rotation of the rotor and ball-nut with respect to the stator and lead screw respectively.

2. The control apparatus as claimed in claim 1 wherein said control apparatus includes means for connection to a thrust demand unit for enabling a pilot to control the engine of an aircraft, said support member of said control apparatus comprising a housing so that said apparatus is usable as a retrofit unit for being incorporated into an existing control system of the type that includes said hand control member to enable control of the aircraft.

3. The control apparatus as claimed in claim 1 wherein said control member, stator and rotor are moveable linearly with respect to said lead-screw and support member.

4. Control apparatus for enabling, in a manual control mode, an operator, and in an automatic control mode, an automatic control system, to control associated apparatus to which, in use, the control apparatus is connected, comprising:
- a support member,
- a lead-screw having means for attachment to a control device,
- a drive assembly including a rotary stepper motor having a rotor fixed to a ball-nut engaged upon the lead-screw and forming a recirculating ball-screw assembly therewith and a stator fixed to said support member,
- output means coupled to the drive assembly indicative of the position of the drive assembly relative to the lead-screw, and,
- motor energization means connected to said motor for selectively energizing windings thereof, said control apparatus being arranged so that in the manual mode in use the drive assembly operates to allow axial movement of the lead-screw by means of a hand control member resulting in corresponding rotation of the rotor and ball-nut with respect to the stator whereupon the windings of the motor are so energized by the motor energization means that said rotation is selectively opposed to provide the operator with a feeling of resistance to movement of the hand control member, and so that in use in the automatic mode the drive assembly moves axially the lead-screw in response to energization of the windings of the motor by the motor energization means with corresponding rotation of the rotor and ball-nut with respect to the stator.

5. Control apparatus for enabling, in a manual control mode, an operator, and in an automatic control mode, an automatic control system, to control associated apparatus to which, in use, the control apparatus is connected, comprising:
- a support member,
- a lead-screw having means for attachment to a control device,
- a drive assembly including a rotary stepper motor having a rotor connected through gear means to the lead screw, a ball-nut engaged upon the lead-screw and forming a recirculating ball-screw assembly therewith and a stator fixed relative to said support member, said ball-nut being connected to a control member having means for connection to a handle control member,
- output means coupled to the drive assembly indicative of the position of the drive assembly relative to the lead-screw, and,
- motor energization means connected to said motor for selectively energizing windings thereof, said control apparatus being arranged so that in the manual mode in use the drive assembly operates to allow axial movement of the lead-screw by manual motion of said control member resulting in corresponding rotation of the rotor and ball-nut with respect to the stator whereupon the windings of the motor are so energized by the motor energization means that said rotation is selectively opposed to provide the operator with a feeling of resistance to movement of the hand control member, and so that in use in the automatic mode the drive assembly rotates through said gear means the lead-screw in response to energization of the windings of the motor by the motor energization means to effect translation of said ball-nut and said control member connected to said ball-nut.

* * * * *